United States Patent [19]

Ishii

[11] Patent Number: 5,379,181

[45] Date of Patent: Jan. 3, 1995

[54] SMOOTHING DEVICE FOR A POWER SUPPLY

[75] Inventor: Kazuo Ishii, Tokyo, Japan

[73] Assignee: Jelmex Co., Ltd., Tokyo, Japan

[21] Appl. No.: 999,115

[22] Filed: Dec. 31, 1992

[30] Foreign Application Priority Data

Jan. 10, 1992 [JP] Japan .................................. 4-20629

[51] Int. Cl.⁶ ...................... H01G 4/32; H01G 9/04; H04B 3/28; H02M 1/12
[52] U.S. Cl. ..................... 361/511; 307/89; 363/47
[58] Field of Search ...................... 361/512, 272, 275.1, 361/511; 363/47, 44, 126; 307/89, 90, 91, 104; 174/32

[56] References Cited

U.S. PATENT DOCUMENTS

| | | | |
|---|---|---|---|
| 3,745,443 | 7/1973 | Weil | 323/17 |
| 4,345,302 | 8/1982 | Kurose | 361/512 |
| 4,425,663 | 1/1984 | Lam | 375/5 |
| 5,028,812 | 7/1991 | Bartky | 307/246 |
| 5,057,972 | 10/1991 | Ishii | 361/512 |

Primary Examiner—Bruce A. Reynolds
Assistant Examiner—Michael D. Switzer
Attorney, Agent, or Firm—Hopgood, Caliamfde, Kalil & Judlowe

[57] ABSTRACT

A smoothing device for a power supply is provided comprising a rectifier for rectifying an output of an alternating current power supply and at least a pair of electrolytic capacitors for smoothing an output of said rectifier. The pair of electrolytic capacitors have a non-polarized structure in which a pair of electrode foils each having an oxide film on a surface are wound into a roll with a separator containing an electrolyte interposed therebetween. A pair of electrodes are connected to each of said pair of electrode foils. At least one of the pair of electrodes has a mark for distinguishing them from each other. The pair of electrolytic capacitors are so connected that magnetic fluxes generated by said electrode foils are cancelled with each other.

7 Claims, 5 Drawing Sheets

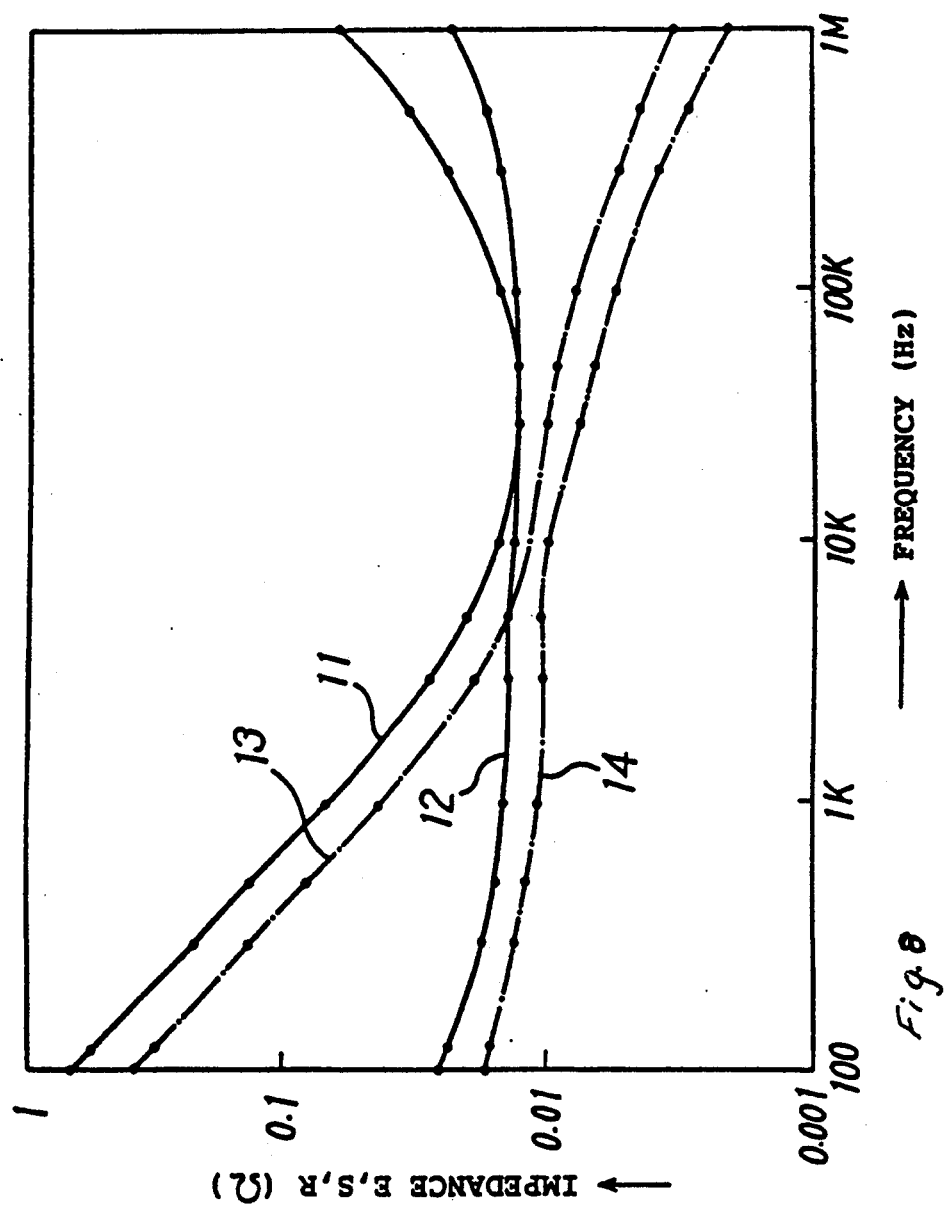

SMOOTHING DEVICE FOR A POWER SUPPLY

BACKGROUND OF THE INVENTION

This invention relates to a low noise smoothing device for a power supply used for highly sophisticated electronic devices.

The need for a low noise smoothing device for a power supply incorporating electrolytic capacitors has been increasing as electronic devices become highly sophisticated. In particular, switching power supply which intermittently rectify a high frequency alternating electric current are widely used for electronic devices of office or home use due to their compact sizes and low prices. However, undesirable radiation referred to as Electro Magnetic Interference (E.M.I) emitted from the electrolytic capacitors incorporated in these power supplies due to a magnetic flux generated from internal electrodes of the electrolytic capacitors has not been prevented since any special attention has not been paid to an arrangement or connection of the internal electrodes. Therefore, a residual ripple noise and the E.M.I. from the power supplies are significant problems in the smoothing devices for the conventional power supplies incorporating the electrolytic capacitors which are developing into a public problem. The problem of the E.M.I. has not been resolved yet since those electronic devices still generate the ripple noise of 0.2% of an output DC voltage, that is about 100 mV–400 mV, despite efforts made by industries manufacturing the capacitors and the power supplies.

SUMMARY OF THE INVENTION

It is an object of the present invention to resolve the problem in the prior art described above.

According to the present invention, a smoothing device for a power supply is provided comprising a rectifier for rectifying an output of an alternating current power supply and at least a pair of electrolytic capacitors for smoothing an output of said rectifier, said pair of electrolytic capacitors having a non-polarized structure in which a pair of electrode foils each having an oxide film on a surface are wound into a roll with a separator interposed therebetween containing an electrolyte and a pair of electrodes each connected to each of said pair of electrode foils, at least one of said pair of electrodes having a mark or code for distinguishing them from each other, and said pair of electrolytic capacitors being so connected that magnetic fluxes generated by said electrode foils are cancelled with each other.

According to another aspect of the present invention, each of said electrolytic capacitors includes a separator containing conductive fine particles such as graphite particles distributed therein in an amount between 0.5 and 7% by weight based on the weight of the separator.

According to a further object of the present invention, a smoothing device for a power supply is provided comprising a rectifier for rectifying an output of an alternating current power supply and at least a pair of electrolytic capacitors for smoothing an output of said rectifier, said pair of electrolytic capacitors having a non-polarized structure in which a pair of electrode foils each having an oxide film on a surface are wound into a roll with a separator interposed therebetween containing an electrolyte and a pair of electrodes each connected to each of said pair of electrode foils, at least one of said pair of electrodes having a mark for distinguishing one from the other, and said pair of electrolytic capacitors being so connected that voltages induced by inductances a said electrode foils of said pair of electrode foils are cancelled with respect to each other.

BRIEF DESCRIPTION OF THE DRAWINGS

FIG 8 is a graph comparatively showing an impedance and E.S.R. characteristics of the electrolytic capacitor according to the present invention and of the conventional electrolytic capacitor selected for the comparison purpose.

DESCRIPTION OF THE PREFERRED EMBODIMENT

Figure 1:
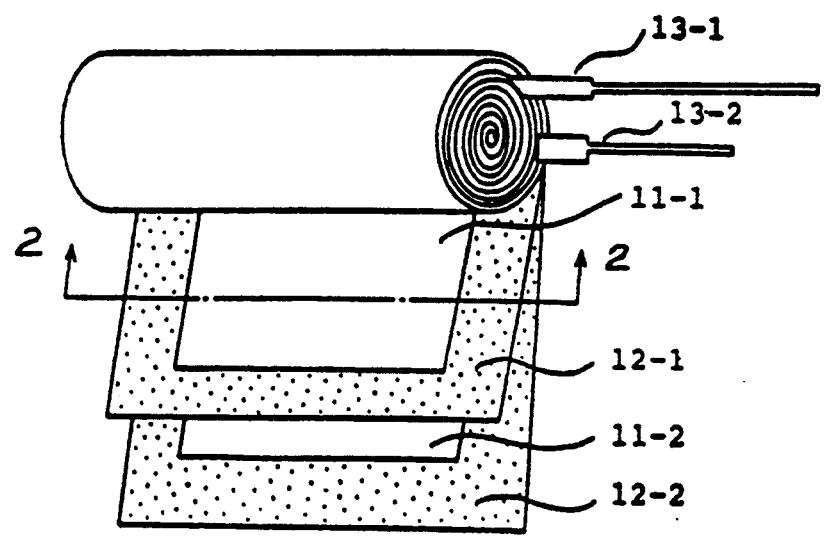
FIG. 1 is a perspective view showing a partly extended structure of a non-polarized electrolytic capacitor used in the present invention.

Preferred embodiments of the present invention will now be described with reference to the accompanying drawings. FIG. 1 is a perspective view showing a partly extended structure of the non-polarized electrolytic capacitor used in the present invention. In FIG. 1, the electrolytic capacitor comprises a pair of electrode foils 11-1 and 11-2 made of an aluminum foil respectively and a pair of sheets of ion permeable separators 12-1 and 12-2 such as Manila papers and the like comprising natural fibers as a main component interposed between the pair of electrode foils 11-1 and 11-2. Separators 12-1 and 12-2 contain a solution such as an ammonium borate which serves as a driving electrolyte. An oxide film (FIG. 2) is formed on a surface of electrode foils 11-1 and 11-2 respectively. These electrode foils 11-1 and 11-2 are laminated with a separator containing an electrolyte interposed therebetween and rolled together to form a cylindrical non-polarized electrolytic capacitor. Lead wires 13-1 and 13-2 are connected to each of electrode foils 11-1 and 11-2 respectively with one of the lead wires made longer than the other one for distinguishing with each other.

Figure 2:
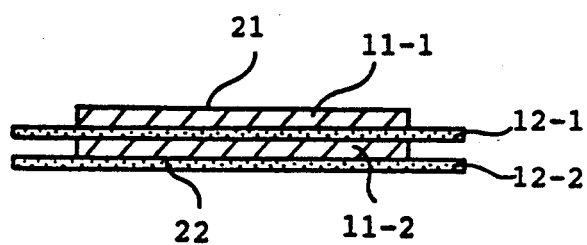
FIG. 2 is a sectional view along the line 2—2 in FIG. 1.

FIG. 2 is a sectional view of the capacitor cut along the line A—A' in FIG. 1. The electrolytic capacitor comprises a pair of electrode foils 11-1 and 11-2 made of an aluminum foil respectively, a pair of oxide films 21 and 22 provided on each surface of the electrode foils and a pair of ion transferring separators 12-1 and 12-2 which contain electrolyte therein and are so laminated that they are interposed between electrode foils 11-1 and 11-2 when they are wound into a roll.

Figure 3:
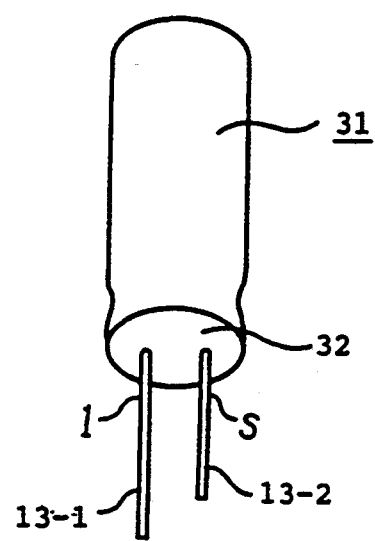
FIG. 3 is a perspective view showing the non-polarized electrolytic capacitor used in the present invention.

The electrolytic capacitor thus wound into a cylindrical roll is sealed into a cylindrical container 31 as shown in FIG. 3, from a sealing portion 32 of which a pair of lead wires 13-1 and 13-2 extend. The longer lead wire 13-1 is represented by a symbol "1" and the shorter one 13-2 is represented by a symbol "s". As a pair of electrode foils 11-1 and 11-2 are of the same dimension and of non-polarized, accurate relation between a pair of electrode foils 11-1 and 11-2 can be recognized by always winding the foils in the predetermined direction, by connecting the lead wire 1 of 13-1 to the upper electrode foil 11-1 and by connecting the lead wire "s" of 13-2 to the lower electrode foil 11-2 shown in FIG. 2.

Figure 4:
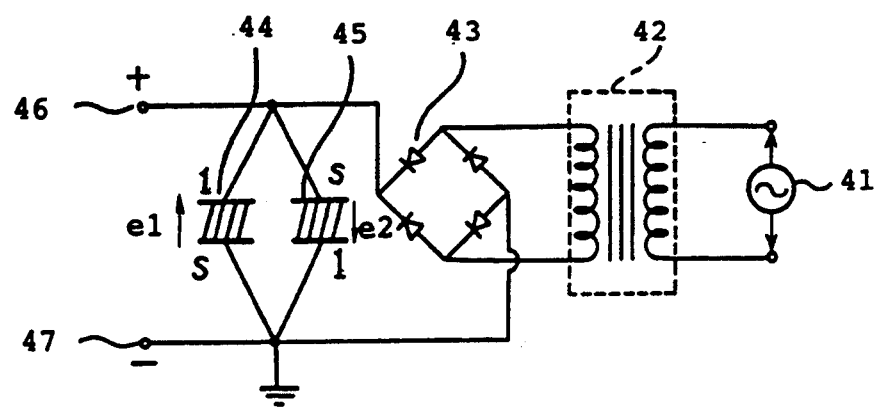
FIG. 4 is a circuit diagram showing an example of the smoothing device for a power supply according to the present invention.
Figure 5:
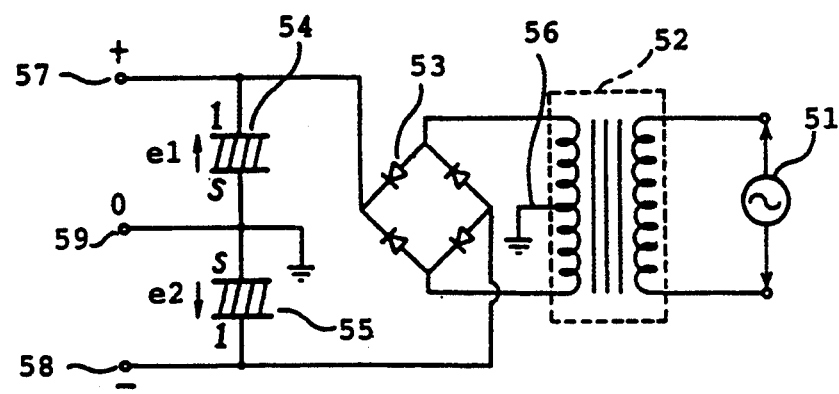
FIG. 5 is a circuit diagram showing another example of the smoothing device for a power supply according to the present invention.
Figure 6:
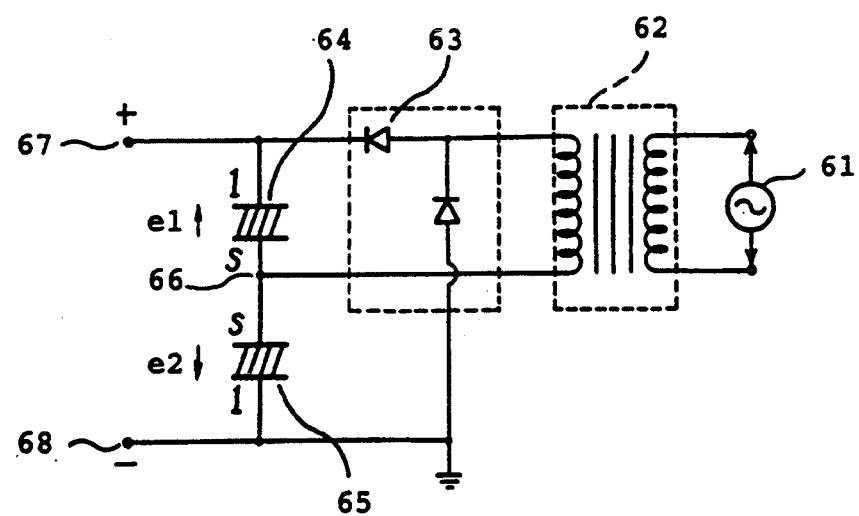
FIG. 6 is a circuit diagram showing an example of the smoothing device for a double voltage rectifier type power supply according to the present invention.

FIG. 4 to 6 are circuit diagrams showing the smoothing devices for a power supply according to the embodiments of the present invention. The smoothing device shown in FIG. 4 is suitable for a switching power supply in which an output of a power source 41 is applied to a rectifier bridge 43 through a transformer 42. The output of rectifier bridge 43 is made smooth by a pair of parallel connected electrolytic capacitors 44 and 45 thereby providing a direct current (DC) output at output terminals 46 and 47. A pair of electrolytic capacitors 44 and 45 are connected in parallel between output terminals 46 and 47 wherein lead wire "1" of one electrolytic capacitor 44 (or 45) is connected to lead wire "s" of the other electrolytic capacitor 45 (or 44).

FIG. 5 shows an embodiment in which the present invention is applied to a smoothing device for a power supply of a positive and negative two output type. An output of a power source 51 is applied to a rectifier bridge 53 through a transformer 52. The output of rectifier bridge 53 is made smooth by a pair of series connected electrolytic capacitors 54 and 55 thereby providing a DC output at output terminals 58 and 57. A pair of electrolytic capacitors 54 and 55 are connected in series between output terminals 57 and 58 wherein lead wires "s" of both electrolytic capacitors 54 and 55 are connected with each other. By providing a neutral point 56 on the secondary side of transformer 52, the positive and negative of the two output type power supply are obtained at output terminals 57 and 58 relative to the ground terminal 59. This type of smoothing devices are widely used for electric circuits in audio and office automation equipments.

FIG. 6 shows an embodiment in which the present invention is applied to a smoothing device for a double voltage power supply. An output of a power source 61 is applied to a double voltage rectifier circuit 63 through a transformer 62. The output of rectifier circuit 63 is made smooth by a pair of series connected electrolytic capacitors 64 and 65 by connecting secondary winding of transformer 62 to lead wire "1" of electrolytic capacitors 64 through rectifier circuit 63 and a point 66 where lead wires "s" of pair of electrolytic capacitors 64 and 65 are connected. A pair of electrolytic capacitors 64 and 65 are connected in series between output terminals 67 and 68 wherein lead wires "s" of both electrolytic capacitors 64 and 65 are connected with each other. An output having a voltage nearly equal to double the input voltage is generated at output terminals 67 and 68.

Figure 7:
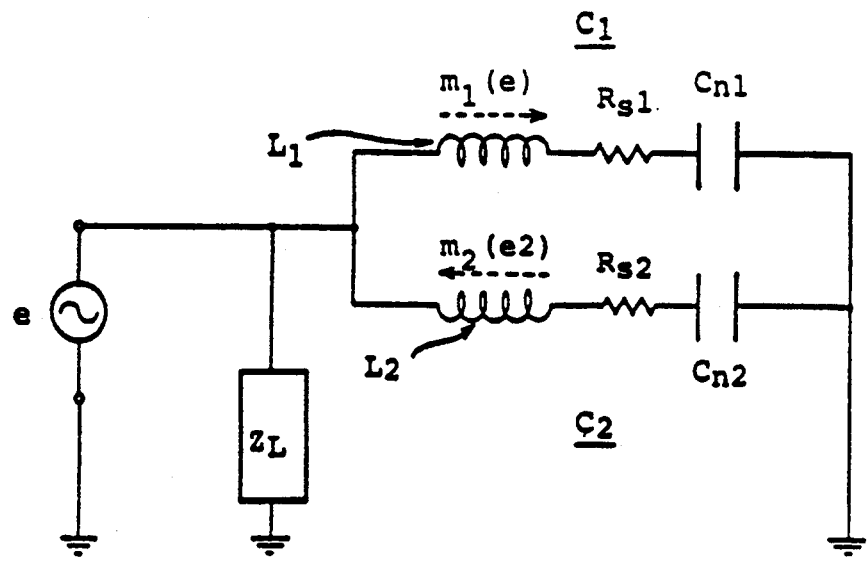
FIG. 7 is a circuit diagram showing an equivalent circuit for explaining the operation of magnetic flux cancellation according to the present invention.

FIG. 7 is a diagram equivalent to a smoothing circuit shown in FIG. 4. A symbol e represents power source 41, transformer 42 and rectifier bridge 43. A symbol $Z_L$ represents a load to be connected between output terminals 46 and 47. C1 and C2 represent a pair of electrolytic capacitors 44 and 45. Electrolytic capacitor C1 comprises a series connection of capacitance Cn1, an equivalent series resistance (E.S.R.) Rs1 and an inductance L1. Inductance L1 is formed mainly by a pair of electrode foils 11-1 and 11-2 wound in a roll shown in FIG. 1 and generates a magnetic flux m1 in a direction shown by a dotted arrow. Similarly, electrolytic capacitor C2 comprises a series connection of capacitance Cn2, an equivalent series resistance (E.S.R.) Rs2 and an inductance L2. Inductance L2 is formed mainly by electrode foil 11-2 wound in a roll shown in FIG. 1. Since electrolytic capacitor C1 and C2 have the same capacitance and the same structure, the value L2 is equal to the value L2 which generates a magnetic flux m2 having the same value as m1 in the direction shown by a dotted arrow which is opposite to the direction of magnetic flux m1. Magnetic fluxes m1 and m2 thus induce AC voltages e1 and e2 across the inductances L1 and L2, respectively, which have opposite polarities with each other. Voltages e1 and e2 are thus cancelled with each other so that the inductances L1 and L2 have substantially disappeared. Noise components contained in the output of the power source e are completely disappeared by being absorbed by capacitances Cn1 and Cn2.

In the embodiments shown in FIG. 5 and 6, a pair of electrolytic capacitors 54 and 55 or 64 and 65 are connected in series with the lead wires "s" of the pair of electrolytic capacitors connected with each other. Since AC voltages e1 and e2 induced across the inductances L1 and L2 of the pair of electrolytic capacitors have the same value but an opposite polarity with respect to output terminals 57 and 58 or 67 and 68 between which the pair of electrolytic capacitors are connected in series, they are cancelled with each other.

FIG. 8 is a graph comparatively showing an impedance and E.S.R. characteristics of a single conventional electrolytic capacitor of 100 v, 2200 $\mu$F and of a pair of electrolytic capacitors of 100 v, 2000 $\mu$F each of which are so connected in parallel that the magnetic fluxes generated from respective electrolytic capacitors cancel each other according to the present invention. As the conventional electrolytic capacitors are usually made by winding a pair of laminated electrode foils separated by a separator, they have an internal inductance which increases at frequencies higher than the resonant frequency of 50 KHz as shown by an impedance curve 11 and E.S.R. curve 12 which are shown by solid lines. In the case of a switching power supply, an output of the rectifier includes a large number of harmonic pulses ranging from 100 KHz to 10 MHz which are higher than the resonant frequency. It is, therefore, hardly expected for the conventional single electrolytic capacitor to suppress the ripple noise.

On the contrary, the total characteristics of a pair of electrolytic capacitors connected in parallel according to the present invention has no resonant frequency as shown by an impedance curve 12 and E.S.R. curve 14 which are shown by chained or dot and dash lines. As shown by curves 13 and 14, the impedance of the parallel connection of the capacitors rapidly decreases as the increase of the frequency. The parallel connection of the capacitors thus completely eliminate the noise due to a large number of harmonic pulses contained in the output of the rectifier.

Table 1 is a comparison table of ripple noises of a 100 KHz switching power supplies of the conventional and of the present invention at the time the smoothing devices of which are fully loaded.

TABLE 1

| Capacitor | Capacitance | Output ripple noise | Efficiency | EMI noise | Heat generation |
|---|---|---|---|---|---|
| Conventional | Polarized 10 V 2200 μf × 2 | 80 mV | 70% | generated | generated |
| Prior parallel connection | Non-polarized 10 V 1000 μf × 2 | 18 mV | — | generated a little | not generated |
| Invented parallel connection | Non-polarized 10 V 1000 μf × 2 | 3.7 mV | 79.5% | generated very little | not generated |

In the smoothing device for the switching power supply, non-polarized electrolytic capacitors (manufactured by Jelmax Co., Ltd. and is called by the trademark as "Black Gate") are used in parallel connection. The capacitors have separators containing 4 weight % of conductive fine particles such as graphite distributed therein. Conventional polarized electrolytic capacitors generate heat when output of a rectifier varying rapidly between a positive value and a negative value is applied to them since they are unidirectional and become conductive in a opposite direction. The non-polarized electrolytic capacitors according to the present invention, on the other hand, do not generate heat and remarkably suppress ripple noises compared with the conventional capacitors since they composed mostly of a reactance component. They can thus be used in power supplies for various kind of low noise apparatuses.

Moreover, with remarkably increased efficiency, the electrolytic capacitors according to the present invention absorb all the harmonic components generated from the rectifier so that they greatly decrease the undesirable emission thereby bringing substantially no adverse influence against outside electronic devices. When a pair of non-polarized electrolytic capacitors having a same structure and characteristics are connected in parallel without such special consideration as taken in the present invention, ripple noise are heavily increased and emission noise are somewhat increased.

It is, therefore, noted that the parallel connection according to the present invention in which the magnetic fluxes generated from the internal electrodes cancel with each other provides a remarkable advantage.

The smoothing device for a power supply according to the present invention can realize low noise operation and greatly high performance in all kinds of electronic apparatuses such as audio video equipments, OA equipments, medical electronics equipments or machine tool controllers since it has an ideal filtering characteristics having no limitation in operational frequencies for signals passing through the power supply.

The smoothing device for a power supply according to the present invention can also realize a noiseless switching power supply which has been impossible in the past. The present invention has also an advantage that it provides an optimum power supply for high quality television systems in which wide band amplification has not been realized with an enough S/N ratio.

What is claimed is:

1. A smoothing device for a power supply comprising:
   a rectifier for rectifying an output of an alternating current power supply; and
   at least a pair of electrolytic capacitors for smoothing an output of said rectifier;
   each of said pair of electrolytic capacitors having a non-polarized structure in which a pair of electrode foils each having an oxide film on a surface are wound into a roller with a separator interposed therebetween and with a pair of electrodes being connected to said pair of electrode foils, respectively, said separator being of an ion permeable material and containing an electrolyte;
   at least one of said pair of electrodes having a mark for distinguishing them from each other; and
   said pair of electrolytic capacitors being so connected to each other that a magnetic flux generated by said electrode foils in one of said pair of electrolytic capacitors is cancelled by another magnetic flux generated by said electrode foils in the other of said pair of electrolytic capacitors.

2. A smoothing device for a power supply according to claim 1, wherein said separator contains conductive fine particles distributed therein in an amount between 0.5 and 7% by weight base don the weight of the separator.

3. A smoothing device for a power supply comprising:
   a rectifier for rectifying an output of an alternating current power supply; and
   at least a pair of electrolytic capacitors for smoothing an output of said rectifier;
   each of said pair of electrolytic capacitors having a non-polarized structure in which a pair of electrode foils each having an oxide film on a surface are wound into a roll with a separator interposed therebetween and with a pair of electrodes being connected to said pair of electrode foils, respectively, said separator being of an ion permeable material and containing electrolyte;
   at least one of said pair of electrodes having a mark for distinguishing them from each other; and
   said pair of electrolytic capacitors being so connected to each other that a voltage induced by an inductance due to said electrode foils in one of said pair of electrolytic capacitors is cancelled by another voltage induced by another inductance due to the electrode foils in the other of said pair of electrolytic capacitors.

4. A smoothing device for a power of supply according to claim 3, wherein said voltage and said another voltage are high frequency alternating current voltages.

5. A smoothing device for a power supply according to claim 3 or 4, wherein said separator contains conductive fine particles distributed therein in an amount between 0.5 and 7% by weight base on the weight of the separator.

6. A smoothing device for a power of supply according to claim 2, wherein said conductive fine particles are graphite particles.

7. A smoothing device for a power of supply according to claim 5, wherein said conductive fine particles are graphite particles.

* * * * *

UNITED STATES PATENT AND TRADEMARK OFFICE
CERTIFICATE OF CORRECTION

PATENT NO. : 5,379,181
DATED : January 3, 1995
INVENTOR(S) : Kazuo Ishii It is certified that error appears in the above-identified patent and that said Letters Patent is hereby corrected as shown below:

On the title page, item [73] Assignee

The assignee's name appears on the patent as "Jelmex Co., Ltd.," whereas it should be --Jelmax Co., Ltd.--

Signed and Sealed this

First Day of October, 1996

Attest:

BRUCE LEHMAN

Attesting Officer

Commissioner of Patents and Trademarks